(12) United States Patent
Seo

(10) Patent No.: US 6,452,911 B1
(45) Date of Patent: Sep. 17, 2002

(54) METHOD OF ALLOCATING VOCODER RESOURCES IN A MOBILE COMMUNICATION SYSTEM

(75) Inventor: Chang Keun Seo, Inchon-kwangyoksi (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/141,423

(22) Filed: Aug. 27, 1998

(30) Foreign Application Priority Data

Aug. 30, 1997 (KR) .............................. 97-44882

(51) Int. Cl.[7] .............................. H04B 7/216
(52) U.S. Cl. .................. 370/335; 370/342; 455/452; 704/221
(58) Field of Search ................. 370/338, 340, 370/341, 320, 493, 494, 495, 217, 221, 225, 335, 331, 468, 328, 465, 352, 353; 455/560, 12.1, 442; 704/200, 201, 229

(56) References Cited

U.S. PATENT DOCUMENTS

| | | | | |
|---|---|---|---|---|
| 5,121,391 A | * | 6/1992 | Paneth et al. ............... 370/341 |
| 5,515,375 A | * | 5/1996 | DeClerck .................... 370/468 |
| 5,710,971 A | * | 1/1998 | Ambrusher et al. ........ 455/12.1 |
| 5,729,536 A | * | 3/1998 | Doshi et al. ................. 370/398 |
| 5,745,854 A | * | 4/1998 | Schorman .................... 455/452 |
| 5,751,718 A | * | 5/1998 | Yip et al. .................... 370/468 |
| 5,781,541 A | * | 7/1998 | Schneider .................... 370/335 |
| 5,793,810 A | * | 8/1998 | Han et al. .................... 375/242 |
| 5,812,968 A | * | 9/1998 | Hassan et al. ............... 704/221 |
| 5,930,714 A | * | 7/1999 | Abu-Amara et al. ........ 370/331 |
| 5,953,331 A | * | 9/1999 | Duncan et al. .............. 370/352 |
| 5,995,923 A | * | 11/1999 | Mermelstein et al. ....... 704/219 |
| 5,998,272 A | * | 11/1999 | Sasamato .................... 370/465 |
| 6,002,999 A | * | 12/1999 | Han et al. .................... 704/201 |
| 6,006,189 A | * | 12/1999 | Strawczynski et al. ..... 704/270 |
| 6,097,817 A | * | 8/2000 | Bigic et al. .................. 380/270 |
| 6,125,110 A | * | 9/2000 | Proctor et al. .............. 370/331 |
| 6,236,855 B1 | * | 5/2001 | Austin ......................... 455/423 |

* cited by examiner

*Primary Examiner*—Ricky Ngo
*Assistant Examiner*—Phuc Tran
(74) *Attorney, Agent, or Firm*—Fleshner & Kim, LLP

(57) ABSTRACT

A method of allocating vocoders during a simultaneous transfer of voice and data frames in a mobile communication system includes allocating a separate vocoder for processing the voice frame and the data frame. When a mobile communication receives a multiple requests for a simultaneous transfer of voice and data frames, the data frames are multiplexed and allocated to a single vocoder. Thus, the availability of the vocoder resources can be significantly increased.

28 Claims, 5 Drawing Sheets

METHOD OF ALLOCATING VOCODER RESOURCES IN A MOBILE COMMUNICATION SYSTEM

BACKGROUND OF THE INVENTION

1. Field of the Invention

The present invention relates to a method of allocating vocoder resources in a mobile communication system using a code division multiaccess (CDMA) system, and more particularly during a simultaneous transfer of voice and data in a mobile communication system.

2. Discussion of Related Art

A mobile communication (MC) system using a CDMA system generally includes a plurality of mobile stations, each mobile station corresponding to one of a plurality of base stations; and a plurality of base station controllers connected to a mobile switching center (MSC). The MC system allows a bidirectional transmission of voice and data among the plurality of mobile stations. Specifically, the MC system provides a transmission rate of approximately 8 kbps between a mobile station and the corresponding base station by a dynamic variable data speed (DVDS) vocoder algorithm.

The DVDS vocoder algorithm is implemented by the operation of selector/vocoder cards (SVC) within the base station controllers. A single SVC consists of one selector and eight vocoders. During the transmission of voice, each vocoder codes the voice frame into voice packets, and decodes the transmitted voice packet into voice sampling data.

The vocoders provide a four-step (9600 bps, 4800 bps, 2400 bps, and 1200 bps) bit frame transmission speeds. The specific transmission speed depends on several factors, one of which is the volume of data to be received/transmitted. However, the transmission speed is mainly dependent upon an input variable raue.

The vocoder employs an adjustable threshold to determine the input variable rate. Basically, the threshold is adjusted according to the level of background noise, but upon receipt of voice data, the threshold is substantially raised. Therefore, the speed of a vocoder, and thus the transmission rate between a mobile and a base station, is generally selected according to an adjustable threshold. By taking into consideration the background noise level, the MC system provides a high quality communication service.

Nonetheless, an advanced communication system must be capable of simultaneously transmitting multimedia such as voice and data such as fax, video, and text. However, a simultaneous transfer of voice and data requires a high number of vocoder resources. Thus, during such transmittal, the availability of the vocoder resources in the base station controller may significantly decrease.

Particularly, if a mobile station requests a simultaneous voice and data transfer service, the corresponding base station informs the base station controller of the receipt of a radio signal containing voice and data frame. The base station controller receives the voice and data frame from the base station, and transmits the data to the MSC. Thus, the frame transmitted to the MSC contains both voice data and non-voice data.

The voice frame must be transmitted to the vocoder in real time by a pulse code modulation (PCM) frame of 64 kbps. An allocated vocoder receives the digitized voice frame and codes the frame into voice packets. However, a separate vocoder must be allocated to the non-voice frame because non-voice frame already comes in packets. Specifically, the non-voice frame bypasses the PCM and merely passes through a vocoder without any coding. As a result, a single vocoder cannot be allocated to transmit both the voice and non-voice data.

Therefore, when a mobile station requests a simultaneous voice and data transfer service, a corresponding base station controller must allocate two vocoder resources in order to effectively perform the voice and data transfer service. Accordingly, when a plurality of mobile stations request the simultaneous transfer service, the availability of vocoder resources can significantly decrease. For example, if four mobile stations request a simultaneous transfer of voice and data, the base station controller must allocate eight vocoders.

Therefore, in the related art, a multiple number of simultaneous transfer of voice and data could not be accomplished without increasing the number of vocoders. Consequently, allocating separate vocoders to simultaneously transfer voice and data is inefficient and unsuitable for the multimedia communication.

SUMMARY OF THE INVENTION

Accordingly, an object of the present invention is to solve at least the problems and disadvantages of the related art.

Another object of the present invention is to provide a method of allocating vocoder resources in a CDMA mobile communication system.

A further object of the present invention is to provide a method of allocating vocoder resources in a CDMA mobile communication system during a simultaneous transfer of voice and data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, one embodiment of the present invention discloses a method of allocating a set of vocoders for processing a voice frame and extra vocoders for processing at least one data frame varied at a given frame rate.

According to another embodiment, the present invention discloses a method of allocating vocoder resources for processing data frame while the base station is already processing voice frame by conducting service negotiations between the mobile station and the corresponding SVC before allocating a vocoder for processing a voice frame and extra vocoders for varying the rate of a plurality of data frames.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the preferred embodiments of the present invention, examples of which are illustrated in the accompanying drawings.

Figure 1:
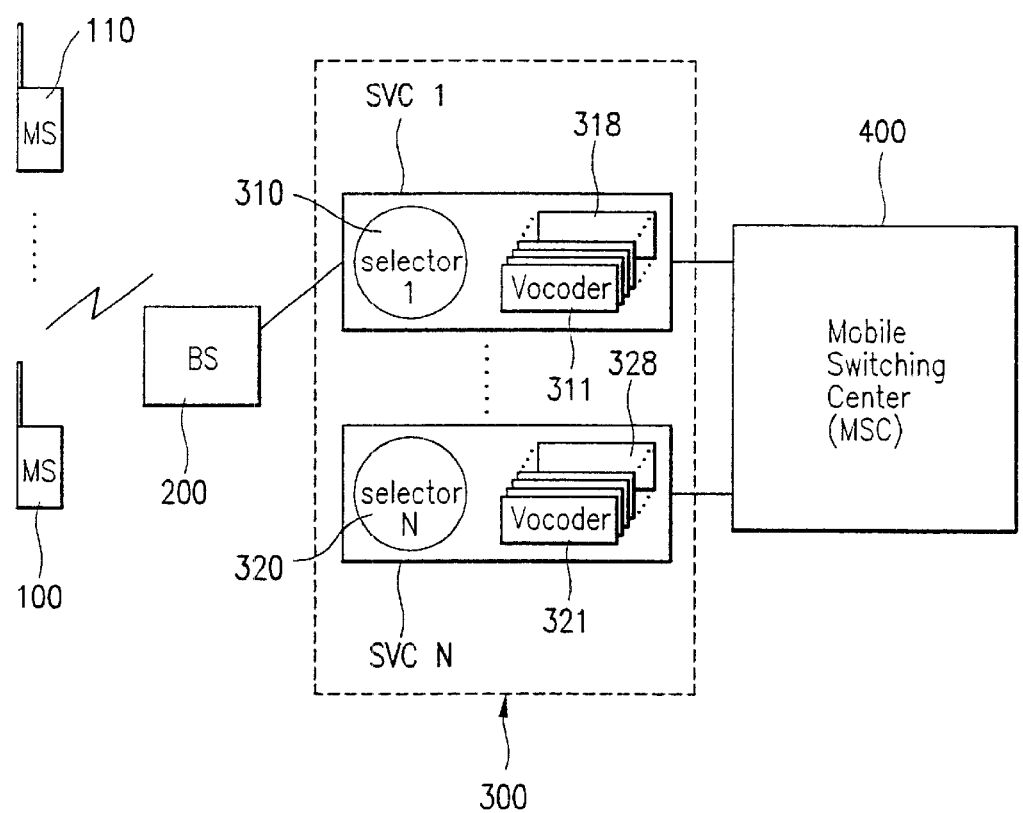
FIG. 1 is a block diagram showing a portion of a mobile communication system using a CDMA system, according to the present invention.

Referring to FIG. 1, a preferred embodiment of a CDMA mobile communication system according to the present invention includes a plurality of mobile stations 100 to 110, each having a wireless data transmitting/receiving capabilities; a base station 200 having a plurality of traffic channels to control and relaying the communication of the plurality of mobile stations 100 to 110; a base station controller (BSC) 300 having a main control processor (CCP) and a plurality of SVCs 1–n, each SVC including a selector 310, 320 and eight vocoders 311 to 318 and 321 to 328; and a MSC 400 having a T-switch, receiving calls from a mobile station through the vocoders 311–318 and connecting the calls to other networks, and controlling the base station 200.

Figure 2:
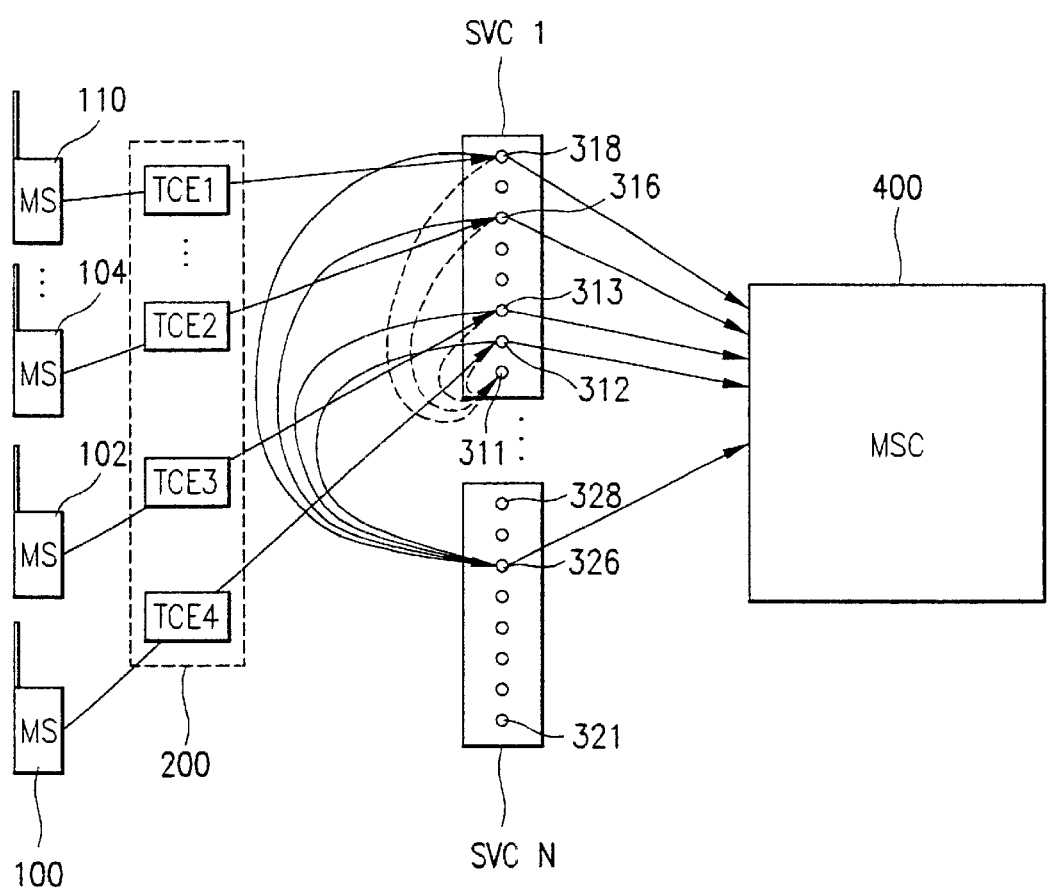
FIG. 2 is a block diagram showing the coupling state between a base station controller and a mobile switching center of FIG. 1.

As shown in FIG. 2, a plurality of vocoders 311 to 318 and 321 to 328 within the SVC 1 and SVC N are connected on a one-to-one basis to the ports of the T-switch (not shown) within MSC 400. Generally, a frame is transmitted between the BSC 300 and MSC 400 at a fixed speed of 64 kbps by PCM. However, a frame is transmitted only at a maximum speed of 14.4 kbps through the common air interface (CAI). Accordingly, approximately 75% of the data in the frame is not available for PCM.

Whereas the maximum speed of frame transmission through CAI is approximately ¼ of the PCM, the actual data is transmitted through the CAI rather than a coded data. Thus, the present invention multiplexes the 64 kbps full-rate frame of the PCM into four 16 kbps sub-rate frames. A detailed description of the preferred embodiment will follow below with reference to FIGS. 3–5.

To request for a simultaneous transfer of voice and data, a user inputs from a mobile station 100 a call number of the destination and presses a "send" key. Upon pressing the "send" key, the mobile station 100 transmits the origination message to the base station 200 through an access channel. The Base Station 200 receives the transmitted message and after examining the message, informs the CCP of the BSC 300 that a message has been generated and the origination of the call. The TCE4 of the base station 200 also transmits a signal "ACK" through a paging channel to the mobile station 100 acknowledging the receipt of the message.

Before connecting and transmitting the call, the CCP of the BSC 300 verifies the states of its own system and the MSC 400. If the BSC 300 and MSC 400 are not in overload states, the CCP connects the call by allocating a frame offset and the vocoder resources, according to the service option of the call origination. The service option may include sending voice frames, data frames, or both voice and data frames.

Figure 3:
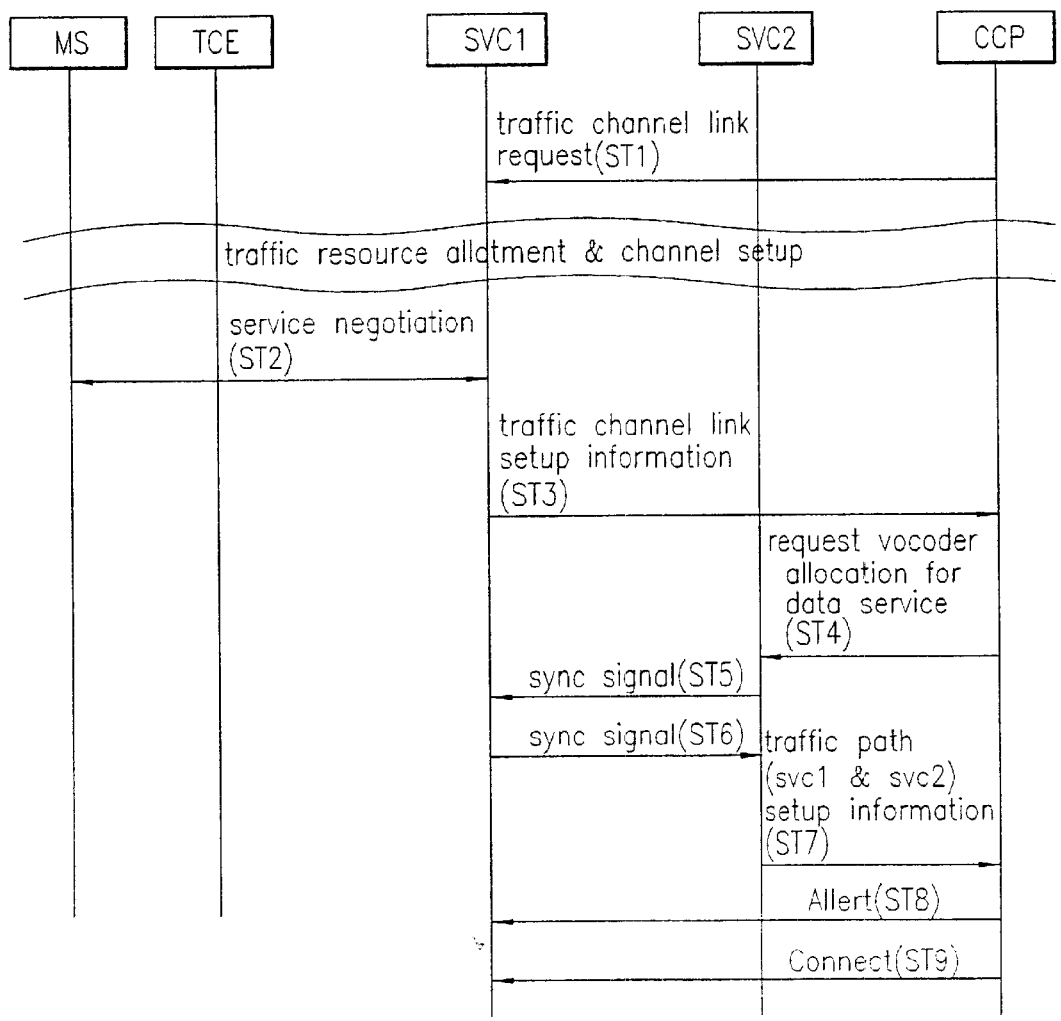
FIG. 3 is a control sequence during a simultaneous voice and data transfer service according to the present invention.

Particularly, the base station 200 receive the message containing both the voice and data frames from the mobile station 100 and transmits the frames to one of the SVCs of BSC 300. FIG. 3 shows the overall control sequence during a simultaneous voice and data transfer service according to the present invention.

After BSC 300 receives the transmitted frames, the CCP requests (ST1) first SVC 1 for traffic channel connection to process the voice and data frames. Selector 310 which controls the vocoders 311 to 318 in SVC 1 conducts (ST2) service negotiations with the mobile station 100 according to the service option set by the mobile station 100.

The service negotiations include service options by a primary traffic frame as well as by a secondary traffic frame according to the J-STD-008 and IS-95-B standards. Because each service is individually executed, the selector 310 separately controls the service states for the voice frame and the service states for the data frame to be in either the active state or the idle state. At this point, both the voice transfer and data transfer services are in the idle state (refer to FIG. 4).

If the service negotiations are completed without significant problems, the SVC 1 reports (ST3) the traffic channel connection setup information to the CCP. The SVC 1 also directs traffic frame to be processed on a one to one basis from the mobile station 100 through the CAI.

According to the results of the negotiations by the SVC 1, the CCP requests the MSC 400 for an allocation of the vocoders and in return, the MSC 400 sends a message responding to the request. If the option of only voice frame or data frame was successfully negotiated for the transfer service, a negotiated service is carried forward without additionally allocating a second vocoder resource.

However, if the results of the negotiations indicates the option for a simultaneous transfer of voice and data, the CCP allocates a second vocoder resource for the data frame, as shown in FIG. 2. Particularly, the BSC 300 allocates the vocoder 312 to decode the voice frame and transmitting the decoded voice frame to the MSC 400. On the other hand, the BSC 300 allocates another vocoder 311 such that the data frame would bypass the coding, as indicated by the dotted lines in FIG. 2.

Referring also to FIG. 2, if three mobile stations 102, 103 and 110 all request a simultaneous voice and data transfer service, the CCP of the BSC 300 allocates three vocoders 313, 316 and 318 to process the voice frames. However, each data frame is multiplexed and transmitted to the vocoder 311, which processes the data frame without coding the frame. The Vocoder 311 is capable of multiplexing and processing the data frames transmitted from a maximum of four mobile stations.

In the first preferred embodiment of the present invention, the vocoder for processing the voice frame is allocated from vocoders 311 to 318 of SVC 1, and the vocoder for processing the data frame is also allocated from vocoders 311 to 318. Thus, the CCP of the BSC 300 allocates the vocoders from one SVC to process both the voice and data frames.

If vocoder 311 has been allocated for the data frame processing, the CCP controls the allocated vocoder 311 to recognize four sub-channels. The SVC 1 is assigned to a sub-channel and receives the data frame through a port within the selector 310 to process the data frame.

In another preferred embodiment of the present invention, the CCP of the BSC 300 allocates the vocoders from two SVCs to process both the voice and data frames. Therefore, instead of allocating one of the eight vocoders 311–318 from SVC 1, a vocoder from SVC N is allocated to process the data frame. Accordingly, the CCP requests a traffic channel connection between the SVC 1 and SVC N by requesting (ST4) the MSC 400 to allocate vocoder resources from SVC N. Particularly, the CCP of the BSC 300 requests a negotiation to allocate a vocoder for the data transfer service.

Also, the service option and the call number of the mobile station 100 are transmitted to the MSC 400. The SVC 1 and the SVC N exchange synchronous signals (ST5 and ST6) to set up the call. The SVCs 1 and N must exchange signals because the mobile stations 100 to 110 and the SVC N transmit and receive frames via SVC 1.

The SVC N generates a task for processing the received frame and a task for transmitting the frame to the mobile station 100. Using the message from BSC 300 containing the address of the SVC 1, the vocoder number and the allocated port, the SVC N checks the state of the internet protocol control (IPC) between SVC N and SVC 1. The IPC state is reported to the CCP of BSC 300 (ST7) and the data for the radio link protocol (RLP) layer is initialized.

The CCP receives the traffic link setup information from the SVC 1 and reports to the MSC 400 the resource allocation and the completion of the communication links of the calling party. The sub-rate circuit identity including the circuit identity code is also transmitted. By the T-switch having a one to one correspondence with the vocoder resource, the MSC 400 can process the multiplexed data frame through the sub-channels.

Afterwards, the CCP of BSC 300 waits for a message from the MSC 400 indicating that the call from a mobile station has been connected. The message that the voice service has been connected is transmitted to the SVC 1, and the message that the data service has been connected is transmitted (ST9) to either SVC 1 or 2. In FIG. 3, the data service connection message is sent to the SVC N.

Figure 4:
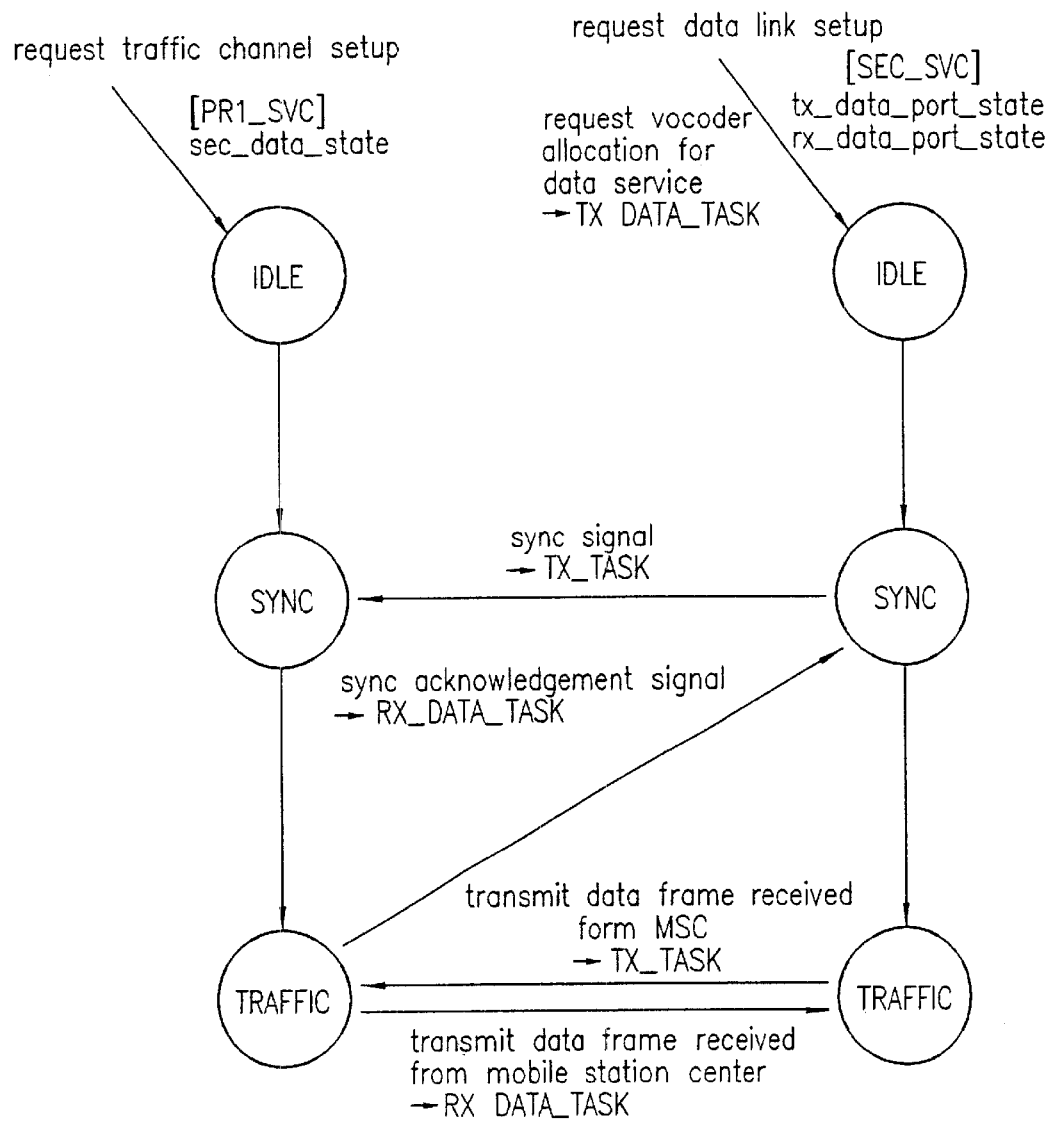
FIG. 4 is a state transition diagram between selector/vocoder cards in accordance with the present invention.

After receiving the connection message, the SVC N initiates to establish through SVC 1 an RLP layer with the mobile station. The SVC N also independently controls the state and buffer with respect to the four ports in order to process the four data frames (FIG. 4).

Figure 5:
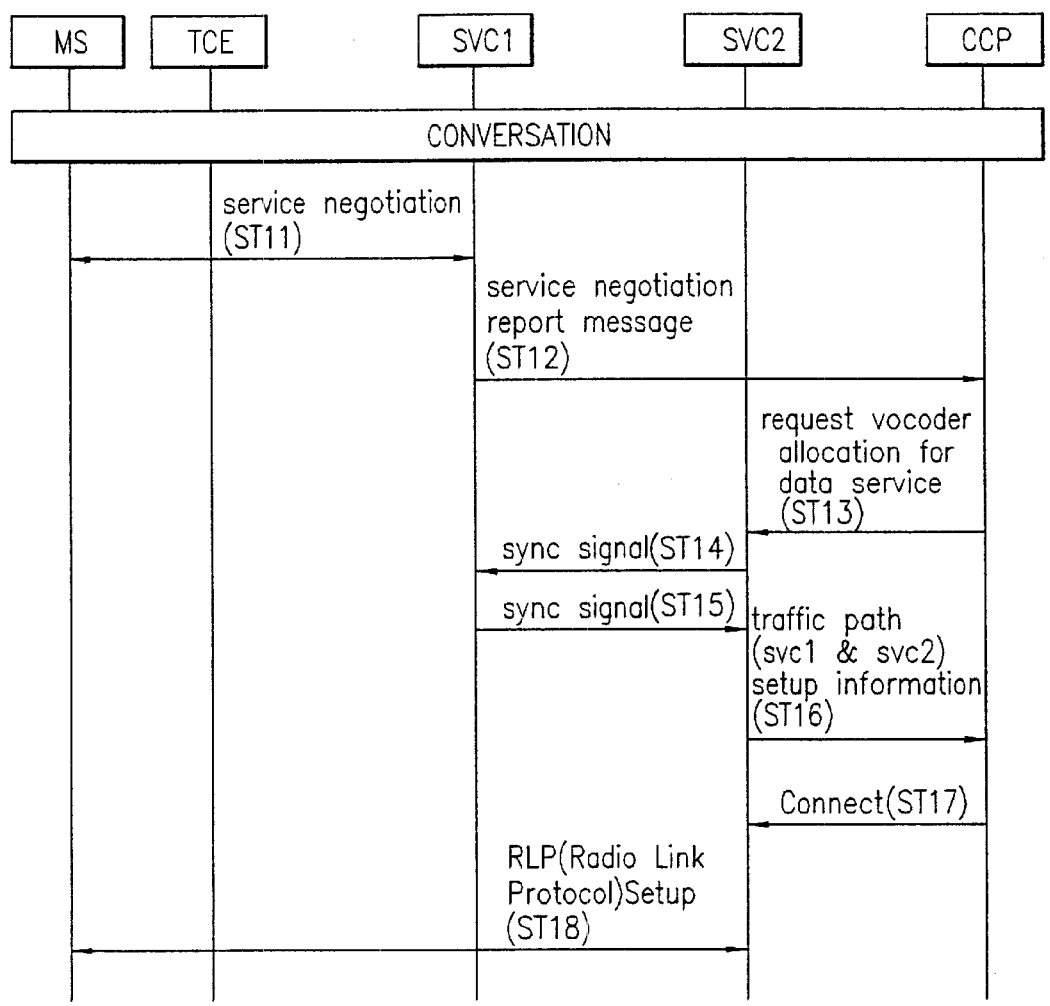
FIG. 5 is a control sequence when a data transfer service is requested during the middle of voice transmission according to another preferred embodiment of the present invention.

FIG. 5 discloses a method of allocating vocoder resources for processing the data frame while the base station is already processing the voice frame.

Referring to FIG. 5, if a request for the data transfer service is received during the voice transfer service, a vocoder for processing the data frame shall be additionally allocated. Thus, if a user requests for a data transfer service during a voice transfer service, the mobile station and the SVC 1 enter into service negotiations through the signaling traffic frame.

The SVC 1 reports the results of the service negotiations to the CCP of the BSC 300's. If the results indicate that an additional vocoder resource is needed for a simultaneous transfer of voice and data frames, the CCP notifies the MSC 400 of a service option needing an additional vocoder resource and receives an allocation of a new vocoder resource. The procedure from this point is the same as that of the simultaneous voice and data transfer service, described above in reference to FIG. 3. Thus a detailed description will be omitted.

By allocating the vocoder resources without increasing the number of vocoder resources, the CDMA mobile communication system according to the present invention enhances the availability of the vocoder resources during a simultaneous voice and data transfer service and when a data transfer service is requested during a voice transfer service. When allocating a vocoder having a maximum of four traffic channels per vocoder, by multiplexing each data frame, different selector/vocoder cards are synchronized to allocate to a single designated vocoder of another selector/vocoder card. As a result, the availability of the vocoder resources can be significantly increased.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of allocating vocoders for processing voice and data, comprising:
   allocating at least one first vocoder to process a voice frame; and
   allocating at least one second vocoder to process a data frame, wherein said voice frame and said data frames are simultaneously processed by the first and second vocoders, and wherein said first vocoder processes the voice frame by coding the voice frame, and said second vocoder processes the data frame by allowing the data frame to bypass being coded, and wherein the second vocoder varies a rate of the data frames and segments a data frame into sub-rate data frames to allow data from a plurality of users to be transmitted in one frame.

2. The method of claim 1, wherein a number of vocoders allocated to process the data frame is smaller than a number of vocoders allocated to process the voice frame.

3. The method of claim 1, wherein the vocoders to process the voice frame and the vocoders to process the data frame are allocated from one selector/vocoder card.

4. The method of claim 1, wherein the vocoders to process the voice frame are allocated from a first selector/vocoder card and the vocoders to process the data frame are allocated from a second selector/vocoder card.

5. The method of claim 1, wherein the data frame is segmented into four sub-rate frames.

6. The method of claim 1, wherein the voice frame and the data frame to be simultaneously processed are received from a single mobile station.

7. The method of claim 1, wherein the voice frames and the data frames are simultaneously processed to be transmitted from a base station controller to a mobile switching center.

8. The method of claim 1, wherein sub-rate data frames from each of the plurality of users are multiplexed into a frame for transmission.

9. A method of allocating vocoder resources in a mobile communication system when a base station receives a request for data transfer service from a mobile station while said base station is already processing a voice transfer service, comprising:
   conducting service negotiations between the mobile station requesting the data transfer service and the selector/vocoder card from which a first vocoder has already been allocated to process the voice transfer service; and
   allocating a second vocoder to process data frames in response to the service negotiations, wherein the first vocoder processes a voice frame by coding the voice frame, wherein the second vocoder processes the data frames by passing the data frames through without being coded, and wherein the second vocoder varies a rate of the data frames and segments a data frame into sub-rate data frames to allow data from a plurality of users to be transmitted in one frame.

10. The method of claim 9, wherein the vocoders to process the voice frame and the vocoders to process the data frame are allocated from one selector/vocoder card.

11. The method of claim 9, wherein the vocoders to process the voice frame are allocated from a first selector/vocoder card and the vocoders to process the data frame are allocated from a second selector/vocoder card.

12. The method of claim 9, wherein the voice frame and the data frames processed are received from a single mobile station.

13. The method of claim 9, wherein the voice frames and the data frames are simultaneously processed to be transmitted from a base station controller to a mobile switching center using a circuit based protocol.

14. A method of allocating vocoder resources in a mobile communication system, when at least one mobile station requests a simultaneous transfer of voice and data service, comprising:

allocating at least a first vocoder from a first selector/vocoder card to process a voice frame; and allocating at least a second vocoder from a second selector/vocoder card to process a data frame, wherein said first and second selector/vocoder cards exchange signals with each other to transmit the voice and data frames, wherein the first vocoder processes a voice frame by coding the voice frame, wherein the second vocoder processes the data frames by passing the data frames through without being coded, and wherein the second vocoder varies a rate of the data frames and segments a data frame into sub-rate data frames to allow data from a plurality of users to be transmitted in one frame.

15. The method of claim 14, wherein said first and second selector/vocoder cards exchange synchronous signals.

16. The method of claim 14, wherein the voice frame and the data frame are received from a single mobile station.

17. The method of claim 14, wherein the voice frames and the data frames are simultaneously processed to be transmitted from a base station controller to a mobile switching center using a circuit based protocol.

18. A method of allocating vocoder resources in a mobile communication system, when a plurality of mobile stations request a simultaneous transfer of voice and data service, comprising:

requesting a first selector/vocoder card of a base station controller to connect a traffic channel;

conducting service negotiations between the mobile stations requesting the voice and data transfer service and said first selector/vocoder card to set up the traffic channel connection;

reporting the traffic channel connection set-up information to the base station controller according to the results of said service negotiations;

requesting a mobile switching center to allocate from the base station controller in response to said set-up information; and allocating at least a first vocoder to process a voice frame and at least a second vocoder to simultaneously process a data frame, wherein the base station controller transmits to the mobile switching center, the voice frame after being coded by the first vocoder and the data frame, which bypasses the coding through the second vocoder, according to said service negotiations, and wherein the second vocoder varies the rate of the data frames and divides a data frame into sub-rate data frames to allow data from a plurality of users to be transmitted in one frame.

19. The method of claim 18, wherein said first and second selector/vocoder cards exchange signals to transmit the voice and data frames.

20. The method of claim 18, wherein said first and second selector/vocoder cards exchange synchronous signals.

21. The method of claim 18, wherein the voice frame and the data frame are received from a single mobile station.

22. The method of claim 18, wherein the voice frames and the data frames are simultaneously processed to be transmitted from a base station controller to a mobile switching center using a circuit based protocol.

23. The method of claim 18, wherein a plurality of sub-rate data frames from the plurality of users are multiplexed into a frame for transmission.

24. A method of allocating vocoder resources in a mobile communication system, comprising:

receiving requests for simultaneous transfer of voice and data service from a plurality of mobile stations;

allocating a first vocoder to process voice data frames;

allocating a second vocoder to simultaneously process non-voice circuit data frames; and allocating a third vocoder to process voice data of a second mobile station of the plurality of mobile stations if the second mobile station requests allocation of the third vocoder for voice and data service when a first mobile station of the plurality of mobile stations uses vocoder resources allocated for voice and data service, and to process non-voice data of the second mobile station using the allocated vocoder resources without establishing a new circuit data link for non-voice data service wherein the second vocoder multiplexes and processes data frames from each of the plurality of mobile stations and is configured to multiplex and process data frames from a maximum of four mobile stations.

25. The method of claim 24, wherein the non-voice data service is performed by controlling sub-channel multiplexing available in a vocoder that processes a non-voice circuit data frame.

26. The method of claim 24, wherein non-voice data generated by a third mobile station is multiplexed into the non-voice circuit data frame.

27. The method of claim 26, wherein non-voice circuit data frames generated by the mobile stations are separately transmitted to a corresponding receiving mobile station at a termination end.

28. The method of claim 24, further comprising allocating a fourth vocoder to process new non-voice data if the non-voice circuit data frame is used at a full rate when data service of a new user is additionally requested.

* * * * *